Aug. 11, 1964 H. S. SCHORY ETAL 3,144,509

AUTOMATIC TIME TRANSMITTER

Filed July 3, 1961 4 Sheets-Sheet 1

INVENTORS
HERBERT S. SCHORY
DONALD A. DOERSCH

BY Paul M. Klein Jr.
ATTORNEY

AUTOMATIC TIME TRANSMITTER

Filed July 3, 1961 4 Sheets-Sheet 2

INVENTORS
HERBERT S. SCHORY
DONALD A. DOERSCH

BY Paul M. Klein Jr.
ATTORNEY

AUTOMATIC TIME TRANSMITTER

Filed July 3, 1961 4 Sheets-Sheet 3

INVENTORS
HERBERT S. SCHORY
DONALD A. DOERSCH
BY
Paul M. Klein Jr.
ATTORNEY

Aug. 11, 1964 H. S. SCHORY ETAL 3,144,509

AUTOMATIC TIME TRANSMITTER

Filed July 3, 1961 4 Sheets-Sheet 4

INVENTORS
HERBERT S. SCHORY
DONALD A. DOERSCH

BY Paul M. Klein Jr.
ATTORNEY 3,144,509
AUTOMATIC TIME TRANSMITTER

Herbert S. Schory, U.S. Navy (% U.S. Naval Communication Station, Kodiak, Alaska), and Donald A. Doersch, U.S. Navy (% U.S. Naval Communication Station, Box 130, Navy 926, FPO, San Francisco, Calif.)

Filed July 3, 1961, Ser. No. 121,788
9 Claims. (Cl. 178—2)
(Granted under Title 35, U.S. Code (1952), sec. 266)

The invention described herein may be manufactured and used by or for the Government of the United States of America for governmental purposes without the payment of any royalties thereon or therefor.

This invention relates to an automatic time transmitter and more particularly to an automatic time transmitter for use with a teletypewriter system for automatically transmitting correct time as a teletyped message.

It is customary in printing telegraph systems such as teletype to transmit the time as the first part of each message being sent so that the recipient, and the sender if a copy is retained, will know the time at which the message was sent. In the prior art the most common way of doing this was for the sending operator to read a clock and type in the time on a manual keyboard. This procedure was often inaccurate especially when, as is customary in U.S. Navy teletyping systems for example, it is Greenwich time which is used and the operator had to distinguish between two hour hands on a communications-type clock (one for local time and one for Greenwich time). Efforts have been made to use a time stamp actuated by an impulse received from a teletypewriter associated with it but this arrangement suffers from certain deficiencies: it is useful only on tape printers and it requires a separate piece of equipment, the time stamp imprinting device, instead of using the teletypewriter or teleprinter itself to print the time message.

An object of the present invention is to provide a system and apparatus for automatically transmitting over a teletypewriter line in teletypewriter code the correct time.

Another object of the invention is to provide a system and apparatus to transmit a heading for a teletypewritten message automatically, giving the correct time, as a function of time itself.

Other objects and many of the attendant advantages of this invention will be readily appreciated as the same becomes better understood by reference to the following detailed description when considered in connection with the accompanying drawings wherein:

FIGS. 1 to 4 show a schematic drawing, including a circuit diagram, of a preferred embodiment of the invention.

GENERAL DESCRIPTION

Since the illustrated embodiment is somewhat complicated, a general description will first be presented so that the overall concept of the invention can immediately be comprehended by a reader skilled in the art. After a reading of the detailed description, a review of the general description is helpful to unify the detailed concepts.

The purpose of the illustrated embodiment of the invention is to transmit a ten character heading to an order wire entry, giving the correct Greenwich time, identified as Greenwich time by the letter Z following the digits representing the time. The ten character message is as follows: carriage return, line feed, figures, the four digits of the correct time, letters, Z, space. The drawing shows operation on five separate teletypewriter order wire circuits independently but the system can be expanded to as many lines as required. While in use by one user, the automatic time transmitter circuit is locked out to all other users.

The primary units of the apparatus are: line control unit, readout unit, time stepping unit, and visual display unit.

The line control unit switches the readout unit to the appropriate teletypewriter line when time is requested by that line, and starts the readout unit through an operating cycle to transmit a time message to the interrogating line. When the readout cycle is completed, the line control unit disconnects the readout unit from the teletypewriter line. Whenever one station is operated, interlocking contacts prevent the control relay for any other station's line from operating. The two contacts of each relay used to switch the teletypewriter line are of the make-before-break type to prevent a momentary break in the teletype line during the switching operation. The line release signal which releases the line control relays is a ground from the readout unit. The ground is interrupted momentarily at the end of the readout cycle to release the line relays. A control signal to energize the coil of the control relay of the readout unit is in the form of a voltage supplied to the coil whenever any line control relay is operated. The signal-in pair comes from the readout unit and supplies signals consisting of dry teletypewriter characters to be applied to the teletypewriter order wire lines. Dry characters, as known in the art, are composed of either short circuits or open circuits.

The readout unit sets up the teletypewriter code combination for the ten character message in proper sequence and distributes the signal elements to the line in serial form, adding start and stop elements. It contains, as previously mentioned, a control relay which operates whenever a control signal voltage is received on one terminal of the relay coil from the line control unit, provided a ground is received on the other terminal of the relay coil via a time shift lockout line. This latter line carries ground except during the approximately two second interval in which the time steppers operate each minute. Once the readout control relay is operated, a holding contact locks ground to one end of the relay's coil preventing its release by a subsequent time shift.

A second set of contacts on the readout control relay supplies power to the clutch magnet of a modified 60 words-per-minute Transmitter-Distributor well-known in the teletypewriter art as a TD. The distributor of this TD supplies the line signals to the line control unit and receives the teletypewriter character code combination from a readout stepping switch. The stepping switch illustrated is a rotary stepper well known in the art having eleven positions or steps, with six banks of contacts. Five of the banks are non-bridging and the sixth is bridging. The non-bridging banks are used to set up the five signal elements of which a teletypewriter character is made up. There are sets of contact springs called the off-normal springs which operate while the stepper is in the eleventh (normal) position. There is a set of normally closed contacts called interrupter springs operated by the stepping armature of the electromagnet which advances the stepper switch. The stepper advances each time current is removed from the coil of the electromagnet; only the interrupter springs operate when current is applied to the coil.

In standard teletype practice every character sent over a teletypewriter line is composed of a permutation of five signal elements, each signal element being designated as either a "mark" or a "space." A mark is sent by short-circuiting for a predetermined time interval the pair constituting the teletypewriter line. A space is sent by open-circuiting the pair for the predetermined time interval. The corresponding contacts on each of the five non-bridging banks of the readout stepper are selectively strapped to set up the appropriate character to be transmitted: no strap for a spacing signal element and a strap (returned to the "stop" segment or element of the distributor ring) for each marking signal element. A switch operated once each revolution of the shaft of the TD is used to control current to the readout stepper coil. As the TD enters the "stop" segment this switch is opened advancing the readout stepper one step and setting up the next character on the TD segments. When the readout stepper is advanced to the eleventh position, one set of the off-normal springs close and short out the signal line thus preventing a partial character being transmitted as the line control relay releases. The second set of off-normal springs open and, as soon as the TD advances far enough to close the contacts of its shaft-operated switch, the stepper coil is again energized opening the normally closed set of interrupter springs. These two sets of contacts (those of the second set of off-normal springs and those of the interrupter springs) are paralleled and are in the ground lead to the line control relay. Thus when both sets open simultaneously, ground is removed from the line control relay. This allows the operated line control relay to release, which removes voltage from the readout control relay. This removes voltage from the TD clutch so that the TD stops upon completing its eleventh revolution. The combined contact arrangement is used to prevent the TD from stopping immediately, leaving the readout stepper in the eleventh position, and leaving the line control relay release lead open which latter would prevent any line control relay from functioning.

The character code element contacts for readout stepper positions four, five, six, and seven are connected to the time stepping unit which supplies the correct teletypewriter code element combinations to print the time of day.

The time stepping unit comprises four stepping switches of the same type described in the readout unit, and a motor operated time switch. The motor is a one r.p.m. type operating a normally open switch for a two-second interval once each minute. The time switch supplies current to the Minute-Units stepper coil, advancing this first stepper one step each minute. The five non-bridging banks of contacts are strapped for a character sequence of 0–1–2–3–4–5–6–7–8–9, the contacts being used together with their respective wipers to control energization of ganged-contact relays, these latter relays being used to set up the code combinations for the readout stepper and to govern the visual display unit. The eleventh position is not used, and the off-normal springs are wired to provide current to the stepper coil, through the interrupter contacts, whenever the stepper is stepped to the eleventh position. This causes the stepper to self-step back to the first position (character zero).

The second set of interrupter contacts on this, and on the other three time steppers, are connected in series to ground, providing the time shift lockout signal to the readout unit control relay. The normally-closed interrupter contacts are used, so that when any one of the time stepper coils is energized, there is no ground for the readout control relay. The two-second interval from the motor-driven time switch insures that a time shift will not occur during the readout operation, since the stepper does not operate until current is removed, and the readout of ten characters requires less than two seconds at a TD speed of 60 words per minute. Should the time shift process start before a readout is called for, the lockout circuit simply delays the start of the readout process until the time shift is completed.

The sixth bank, position eleven, contact controls current to the Minutes-Tens stepper, advancing it one step for each cycle of the Minutes-Units stepper, which requires ten minutes.

The Minutes-Tens stepper is similar to the Minutes-

Units stepper, but has only the sequence 0–1–2–3–4–5 connected in the five character element banks to govern ganged-contact relays. The sixth bank is connected so that positions seven through eleven provide current to operate an auxiliary relay. One set of normally-open contacts on the auxiliary relay provides current through the interrupter springs of the stepper to self-step it back to the first position, upon reaching the seventh. The second set of normally-open contacts on the auxiliary relay controls current to the following stepper, the Hours-Units, advancing it one step per cycle of the Minutes-Tens stepper (one hour). The auxiliary relay provides an adequate stepping pulse interval to the following stage for dependable operation.

The first five banks of the Hours-Units stepper are identical with the Minutes-Units stepper. The sixth bank contacts control current to a second auxiliary relay; position eleven always operating the relay, and positions five through ten operating the relay when the following Hours-Tens stepper is resting on the teletypewriter character code for "2" (positions 3–6–9). The contact connections for this auxiliary relay are the same as the other, one set providing advance for the following Hours-Tens stepper, and the other providing self-stepping for the Hours-Units stepper. The cycle of the Hours-Units stepper is variable, because of the connections in the sixth bank from the Hours-Tens stepper, requiring ten hours for the 0000 to 1000 and 1000 to 2000 cycles, and four hours for the 2000 to 0000 cycle.

The Hours-Tens stepper has the sequence 0–1–2–0–1–2–0–1–2, with both the tenth and eleventh positions blank, connected to govern through only two ganged-contact relays the character element banks for readout stepper position four and to govern the appropriate register of the visual display unit. The sixth bank has contacts ten and eleven connected to the interrupter springs for self-stepping back to position one from position ten.

The visual display unit is governed, as stated, by the ganged-contact relays associated with the time-steppers. The operation is simple enough so as not to warrant a general description in addition to the detailed description given hereinafter.

DETAILED DESCRIPTION

Figure 1:
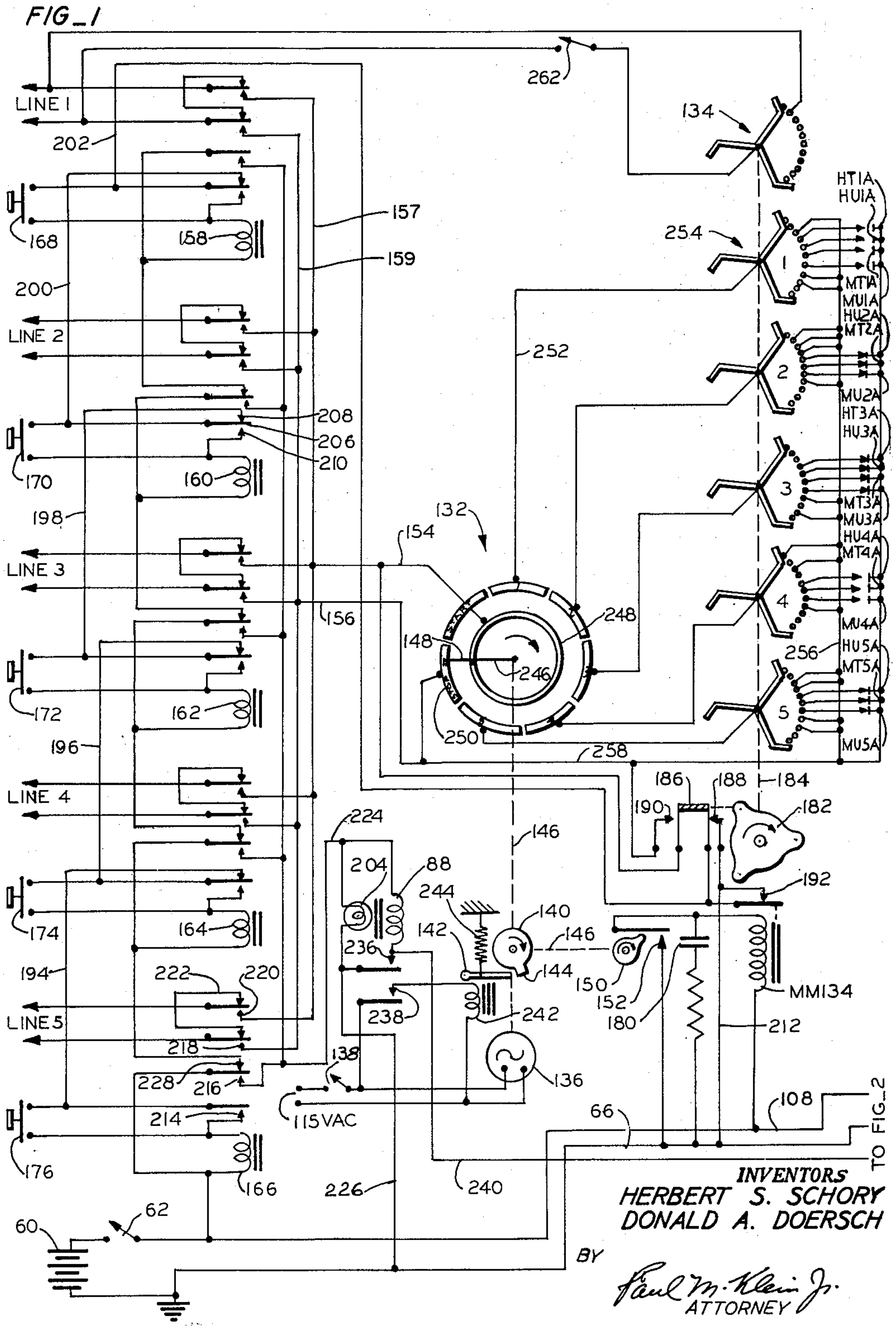
Figure 2:
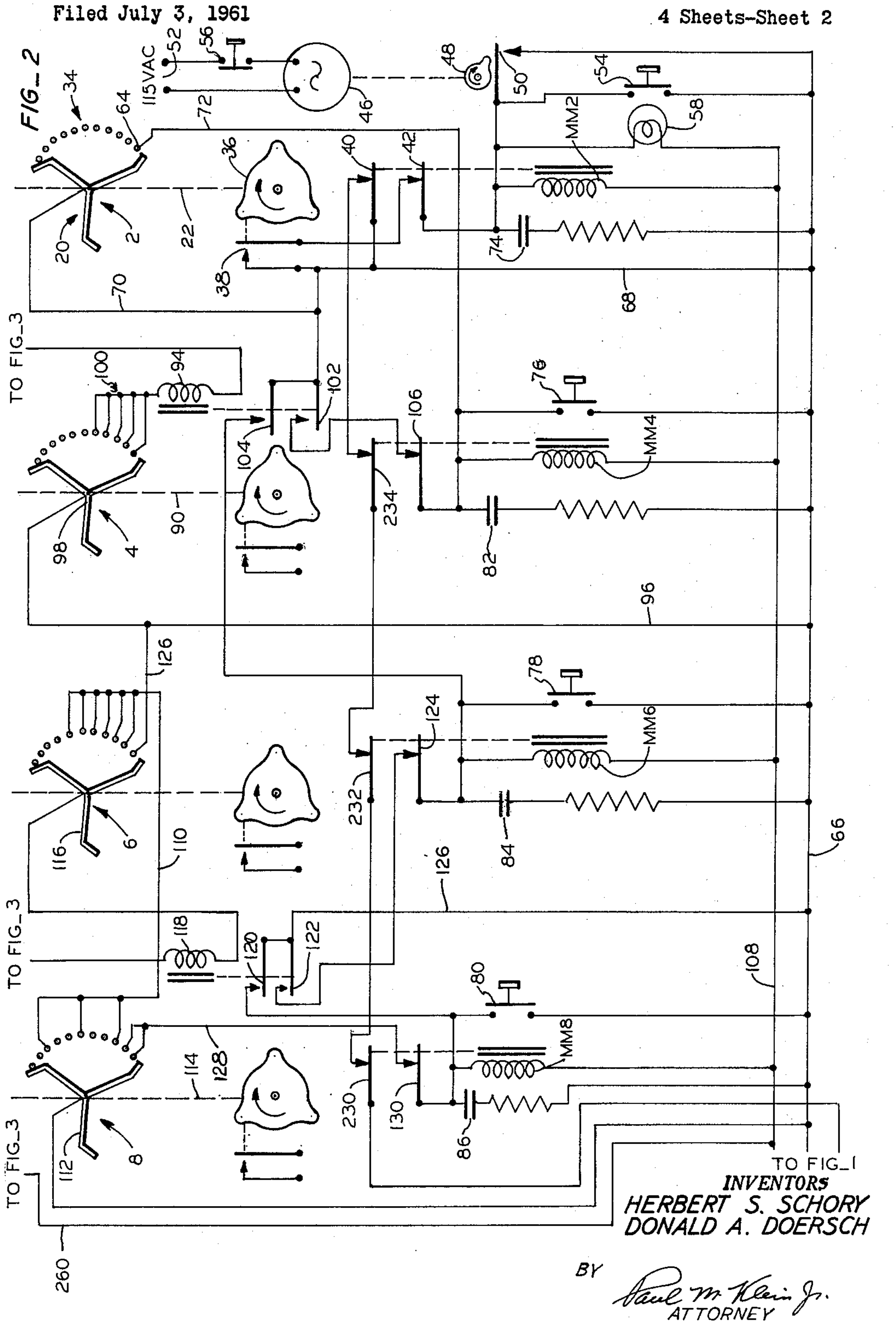
Figure 3:
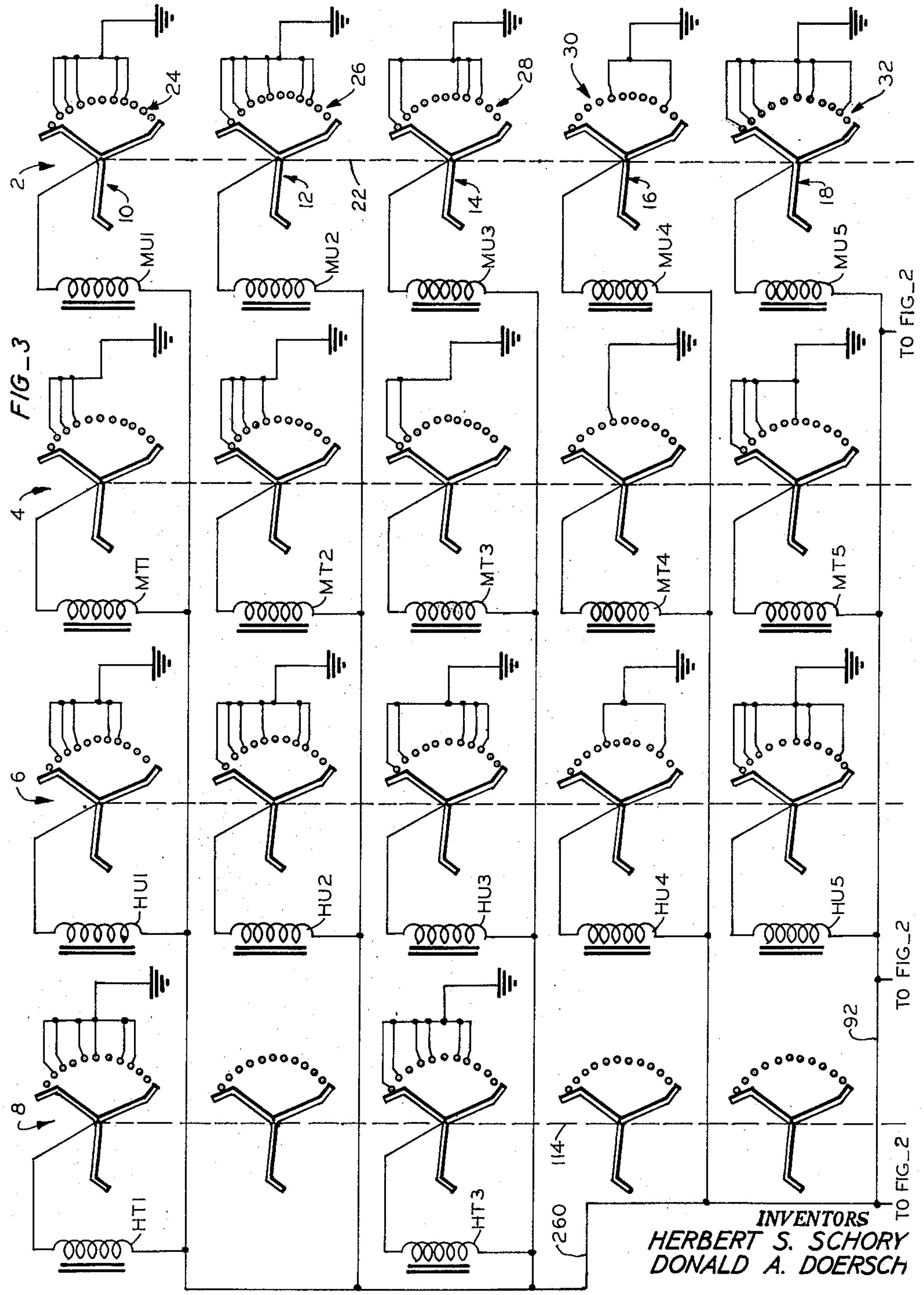
Figure 4:
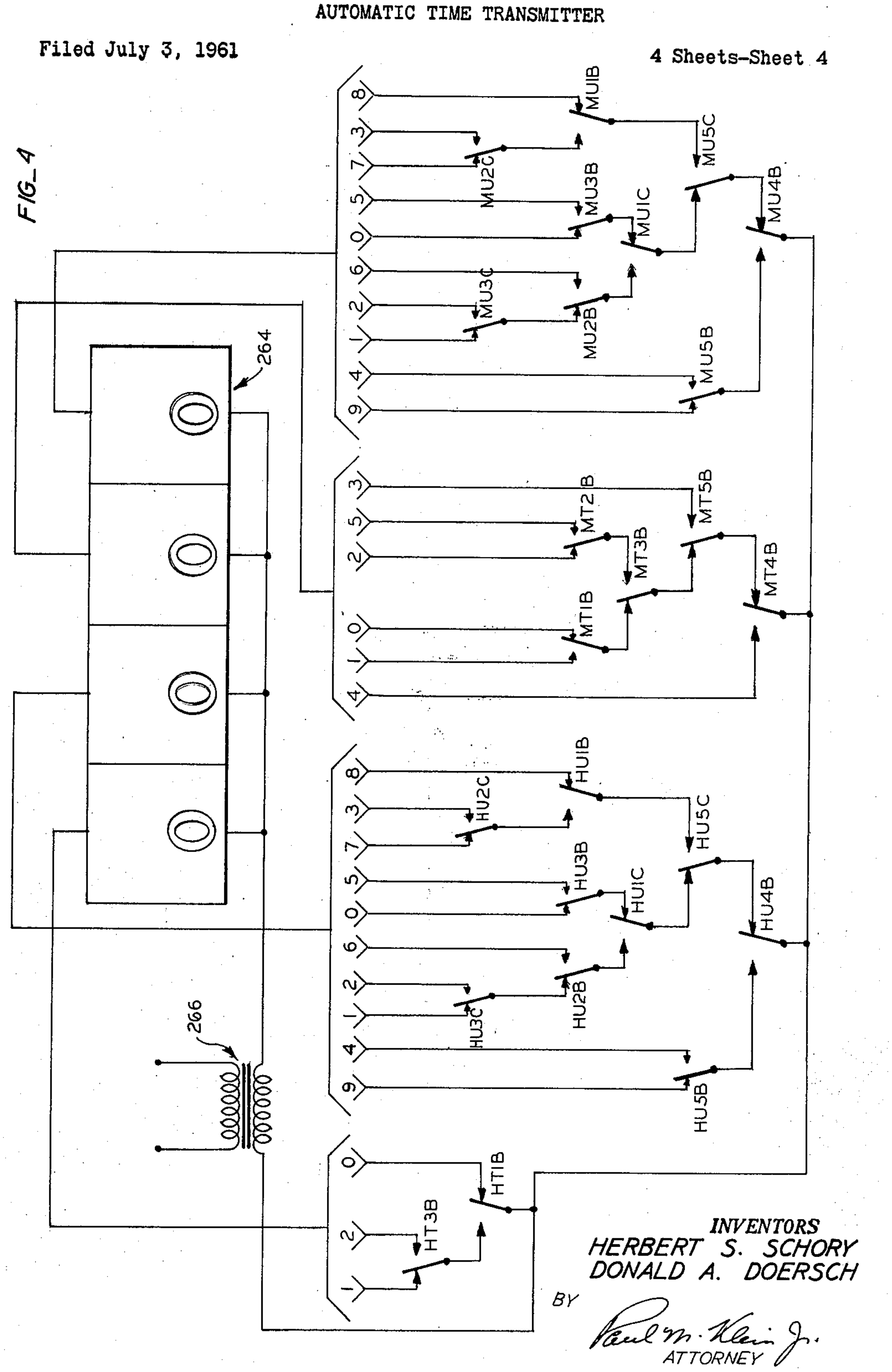

Reference is now made to the drawings which should be observed as an assembled unit for ease of understanding with the sheet of FIG. 1 vertical, the sheet of FIG. 2 horizontal and to the right of that of FIG. 1, the sheet of FIG. 3 horizontal and above FIG. 2, and the sheet of FIG. 4 horizontal and above FIG. 3. All four figures are part of the same circuit and have been drawn on separate sheets only for clarity.

*Time Stepping Unit*

The apparatus includes a time stepping unit comprising four stepping switches indicated generally at 2, 4, 6, and 8. These may be of any type capable of performing the time stepping function, of which many are well known in the art, but the variety manufactured by the Automatic Electric Company of Northlake, Illinois, described as rotary stepping switch Type 44 in their Technical Bulletin No. 473, copyright 1959, has been found quite satisfactory. These stepping switches are shown schematically in an exploded form for clarity. Since they are identical in construction, switch 2 will be described in detail as illustrative for all.

The switch comprises six three-armed wipers, indicated generally as 10, 12, 14, 16, 18, and 20, fixed to a shaft, shown as dotted line 22. The shaft is rotated in steps by a pawl and ratchet, not shown, through the operation of an electromagnet in response to momentary pulses of current. The electromagnet, known as a motor magnet, is labelled MM2 for switch 2 and, similarly MM4, MM6 and MM8 for switches 2, 4, 6, and 8, respectively. There are commonly two types of driving mechanism for this general category of rotary step switch: direct and indirect. Either type is suitable for this invention but the type chosen is the indirect mechanism. In the direct drive mechanism the wipers step when the motor magnet is energized. In the indirect mechanism the switch is spring driven. That is, the wipers advance with the release of the armature or when the motor magnet is de-energized. When the motor magnet is energized it attracts the armature towards the coil core which causes the driving pawl to be withdrawn from the tooth of the ratchet wheel and into engagement with the next ratchet tooth. This movement causes a coil type driving spring tensioned against the armature to store mechanical energy. Demagnetization of the motor magnet allows the driving spring to exert force, through the pawl, on the ratchet tooth, moving the wipers ahead one step. The time shift process is thus seen to include the two sequential steps of energizing the motor magnet and then deenergizing it and essentially spans the time for the armature to go from its rest position to its attracted position and back to its rest position.

The wipers, to each of which a circuit is usually connected, engage stationary terminals to each of which a selected circuit is usually wired. These stationary terminals are assembled as a unit to form a bank in the shape of a circular arc. Switch 2 has six such banks indicated generally at 24, 26, 28, 30, 32, 34.

Also fixed on the shaft 22 carrying the wipers is a cam 36 for operating what are known as off-normal springs 38 comprising a switch. Off-normal springs operate when the wipers are stepped from the normal or home position and restore when the wipers return to the normal or home position. A lobe on the cam 36 moves away from these springs when the switch steps off-normal permitting them to operate from their tension. The showing in the drawings is designed for clarity and not intended to show actual timing or contacting relations which will be made clear from the written description.

Interrupter springs 40 and 42 are operated by the armature arm of the motor magnet with each movement of the armature assembly. The interrupter springs comprise switches as do the off-normal springs. The dotted line leading from the interrupter springs 40, 42 to the motor magnet MM2 suggests the action schematically: when the motor magnet MM2 is actuated, the switches at 40 and 42 are opened.

The stepping switches of the time stepping unit are caused to step at uniformly spaced time intervals, conveniently with a basic interval of one minute, so that the configuration of the assembly of stepping switches at any moment gives essentially a representation of digitized time. Any clock mechanism which will produce an impulse at regular time intervals will serve to step the stepping switches. One of the simplest, which has proved quite satisfactory is a 1 r.p.m. synchronous motor 46 driving a single-lobed cam 48 which operates a normally-open switch 50 once each minute to energize motor magnet MM2 with a current pulse. Considering the operating times of commonly available components which can conveniently be used to construct a preferred embodiment of this invention, it is desirable to design the cam 48 so that it holds the switch 50 closed for two seconds. The motor 46 is supplied with current from terminals 52.

To set the apparatus for properly timed operation a manually operated normally-open minute set switch 54 and a manually operated normally-closed second set switch 56 are provided. Assuming the apparatus is, for example, some appreciable number of seconds slow as evidenced by observation of the operation of the digital visual time display device (FIG. 4), hereinafter described, the instant this digital clock passes a minute mark the button 56 is depressed to open the circuit to motor 46. Thereafter the button 54 is immediately depressed to step the motor magnet MM2 one minute ahead and thereupon released. Immediately upon receipt of a time signal from a correct standard source, such as a radio station WWV for example, the button 56 is released and the motor 46 again starts to operate in synchronism with the correct time.

The four stepper switches 2, 4, 6, and 8 are designated, respectively, as the Minutes-Units stepper, the Minutes-Tens stepper, the Hours-Units stepper, and the Hours-Tens stepper. Each determines the appropriate digit to be exhibited visually on the digital clock or visual display mechanism and also prepares a source of signal elements constituting the teletypewriter code representing that digit to be sent out over a teletypewriter circuit. In addition the steppers are interconnected so that the Minutes-Units stepper automatically causes the Minutes-Tens stepper to advance one step for each ten steps of the Minutes-Units stepper and so forth with the remaining steppers. The apparatus is conveniently illustrated as using a twenty-four hour clock system as is common in the U.S. Navy and in certain European countries for railroad time schedules. In this system the time goes from 0000 to 2359 over a 24-hour period.

In order simultaneously to complete with only a six-bank stepper switch, such as 2 for example, the number of circuits necessary to establish visual display of a digit, a five-element teletypewriter code for the digit, self-stepping of the stepper switch, and carryover of the stepping signals to the adjacent stepper, it has been found practical to use electromagnetic ganged-contact relays, each relay being operated by one stepper switch wiper and its associated bank of terminals. To provide the necessary number of circuit closures double throw relays are preferred. For clarity each relay is shown exploded or dissected with its electromagnetic coil shown in its respective wiper circuit adjacent its respective wiper in FIG. 3, and with its visual-display-controlling contacts shown in FIG. 4 in association with the visual display panel, and with its teletypewriter code combination control contacts in FIG. 1 associated with the readout unit of the invention. The relays governed by the Minutes-Units stepper switch are each designated by MU with a following numeral applied to their coils indicating which bank of the stepper governs the particular relay. Each contact of each of the Minutes-Units relays carries the same indicia as the coil plus, in accordance with the nomenclature common in the art, a letter A, B, or C. Thus, for example, MU4A represents the A contact of the relay governed by the fourth bank of the Minutes-Units stepper switch. Similar nomenclature is used for the Minutes-Tens relays, the Hours-Units relays, and the Hours-Tens relays.

Returning to the description of the time stepper unit construction and operation, a lamp 58, connected in parallel with motor magnet MM2, it used to indicate by its light that the time stepper unit is undergoing a time shift. The power for operating the stepper switches, the indicating lamp 58 and certain other parts of the embodiment is supplied from any convenient source shown as a battery 60 controlled by a switch 62.

Assuming switch 62 is closed, then each time cam 48 closes switch 50, light 58 goes on and the armature of motor magnet MM2 is attracted to its coil cocking its drive spring. Upon the opening of the switch 50, the drive spring rotates shaft 22 stepping each of its six wipers one step ahead to the next contact position. Since the illustrated embodiment uses a time system wherein the units digit representing time varies from 0 through 9, the Minute-Units stepper switch is provided with eleven contacts in each bank to provide enough for a unique configuration associated with each of the aforementioned ten digits plus an eleventh contact available on one bank, shown as 64 on the sixth bank to cause stepping of the minutes-Tens stepper and to cause self-stepping of the Minutes-Units stepper. The configuration in which the illustrated embodiment is shown is that corresponding to midnight, exhibited on a digital clock as 0000. When the Minutes-Units stepper steps from the ninth minute position to the tenth minute position following this 0000 position (the first position), then wiper 20 connects ground to one side of motor magnet MM4 from line 66, line 68, line 70, and line 72. This grounding energizes motor magnet MM4 and causes Minutes-Tens stepper switch 4 to advance one step to the configuration representing the digit "1" in the Minutes-Tens column of a digital clock.

Because of the lobes on cam 36, the off-normal spring or switch 38 closes once for each third of a revolution of shaft 22 or each eleven openings of switch 50. This occurs, as does the energizing of MM4, at the end of a ten minute period following midnight and causes grounding of one side of motor magnet MM2 from line 68 through switch 38 and switch 42, which latter is of course closed upon the opening of switch 50. This grounding of one side of MM2 causes self-stepping of stepper switch 2 to advance it one step bringing it to rest at the first position corresponding to zero in the Minutes-Units column of the digital clock. Self-stepping ceases at this point because there is no longer a ground supplied to one end of MM2 inasmuch as off-normal switch 38 is open. The aforedescribed process repeats, so long as motor 46 continues to operate, with one step occurring at the end of each minute under the action of cam 48 and self-stepping occurring at ten minute intervals as the stepper switch 2 advances from the configuration corresponding to 0 minutes-units through 9 minutes-units and thence back to 0. To insure trouble-free operation of switch 50 and switch 54 an arc suppressor network 74 is provided.

Manually operable switches for initial setting and resetting of the Minutes-Tens, Hours-Units, and Hours-Tens stepper switches are provided at 76, 78, and 80, respectively, similar to switch 54. Arc suppressor networks for each are shown respectively at 82, 84, and 86.

It may be noted at this juncture that opening of the interrupter switch 40 during time shift prevents interrogation of the equipment for the time because it opens the circuit supplying the coil of control relay 88, hereinafter described. This avoids the transmission of garbled information which would otherwise be sent out during actual advancing of stepper switch 2 from one position to the next.

Since the method of representing time chosen to be used by the illustrated embodiment of the invention employs only the digits 0 through 5 in the minute-tens register of a digital clock, the Minutes-Tens stepper switch 4 is constructed to operate accordingly. When shaft 90 of stepper 4 reaches the sixth step after the character zero position the stepping circuit for MM4 is energized. The live side of the voltage source 60 is permanently connected by line 92 to one side of the auxiliary relay 94. Ground is supplied to the other side of relay 94 to energize it through line 96, an arm of wiper 98 and the 7th, 8th, 9th, 10th, and 11th positions of this sixth bank of switch 4 shown strapped together at 100. The wiper 98 on the sixth bank is a bridging wiper. Bridging wipers have long flat tips. This permits a bridging wiper to engage the next bank contact before breaking away from the preceding one, during rotation.

When relay 94 is thus energized, it closes switches 102 and 104. Thereupon motor magnet MM4 is energized, by being grounded on one end through line 68, switch 102, and interrupter switch 106. This causes self-stepping of switch 4 through its last five positions until the arm of wiper 98 clears the last strapped contact. Thereupon wiper 98 returns to the first position (character zero) and relay 94 is deenergized opening the circuit of MM4 and allowing stepper 4 to rest at its first (character zero) position.

During this fast self-stepping of stepper 4 the auxiliary relay 94 is kept continuously energized because of the bridging tips on wiper 98. This keeps switch 104 closed for five times the normal pulse length and it remains closed until wiper 98 again returns to its first position. This relatively long closure time of switch 104 allows for a smoother operating pulse to be fed to motor magnet MM6 from voltage source 60 through live line 108 and thence through the coil of MM6, relay contacts 104, and line 68 to ground. This pulse causes Hours-Units stepper switch 6 to advance one step.

Under the system of digitized time used by the illustrated embodiment of the invention wherein the digital clock may read only from 0000 to 2359, the value of the digit in the hours-units column is permitted to exceed "3" only when the digit in the hours-tens column is "0" or "1" but not "2." Means are provided to insure this type of operation including line 110 connecting certain strapped contacts on the 6th bank of stepper 6 with certain other strapped contacts on the 6th bank of stepper 8. So long as the line 110 remains disconnected from ground by virtue of grounded wiper 112 of Hours-Tens stepper 8 remaining out of contact with each of the three terminals of its associated bank which are strapped to one end of line 110, then motor magnet MM6 operates just like motor magnet MM2. That is, Hours-Units stepper 6 can step from the character zero position all the way through the character nine position. However, when Hours-Tens stepper 8 reaches a configuration corresponding to a digit "2" in the hours-tens column of the digital clock (which occurs three times during each one-third of a revolution of shaft 114 of stepper 8), an arm of grounded wiper 112 places ground on line 110 and hence on the strapped contacts at positions Nos. 5, 6, 7, 8, 9, and 10 of the 6th bank of stepper 6.

This grounding of line 110 causes fast self-stepping of Hours-Units stepper 6 since this grounding energizes, through the medium of wiper 116, the relay 118, closing the latter's switch contacts 120 and 122. The closing of switch 122 in turn energizes motor magnet MM6 through interrupter contact 124. The coil 118 remains energized, as previously stated, while the bridging wiper 116 passes in contact with the terminals of the fifth through tenth positions of its bank grounded by line 110 but it also remains energized as wiper 116 contacts the eleventh position terminal of its bank since this eleventh position terminal is permanently grounded through line 126 and line 96. As stepper 6 undergoes fast self-stepping through positions Nos. 5–11, switch 120 is thus held closed for seven times the normal pulse length giving ample time for a smooth advancement of one step by shaft 114 of the Hours-Tens stepper 8 under the action of motor magnet MM8 supplied with a ground connection to energize it through switch 120 and line 126.

In each period of twenty-four hours stepper 8 goes successively through three positions, that is, through configurations corresponding to digits "0," "1," and "2" in the hours-tens register of the digital clock. For simplicity and to make best use of all conveniently available contact terminals on the stepper 8 (chosen for ready commercial availability and interchangeability to be identical with the eleven-point switches 2, 4, and 6), the shaft 114 is arranged to turn through one-third of a mechanical revolution each three days. Thus there are three "0" positions, three "1" positions, and three "2" positions for shaft 114 during each 120° of its rotation. Since there are eleven terminals available during each 120° of rotation and eleven is not evenly divisible by three, there are two leftover terminals at the tenth and eleventh points and the stepper 8 is caused to undergo fast self-stepping past these two terminals back to the first position. This self-stepping is accomplished by energizing motor magnet MM8 by completing its circuit to ground from grounded wiper 112 and thence through the last two terminals of its associated bank strapped to line 128 and finally through interrupter switch 130.

The reason that the eleventh position terminal of the bank associated with wiper 116 of stepper 6 is permanently grounded, as previously described, by line 126 is that stepper 6 must under all circumstances be caused to return to the character zero position (first position) as the next rest position following the character "9" (tenth) position. That is, the Hours-Units stepper 6 must be caused to return to the configuration corresponding to "0" in the hours-units register of the digital clock each time after it has rested at the configuration corresponding to "9" in the hours-units register, regardless of whether the Hours-Tens stepper 8 is at character "0" position, "1" position, or a "2" position. Hence the permanent ground through line 126 is used for the eleventh point terminal of the bank associated with wiper 116 rather than using, as with the strapped Nos. 5–10 positions, a transitory ground existing only when stepper 8 is in a "2" configuration.

From the foregoing description of the construction of the apparatus it will be apparent that whenever the time stepping unit arrives at a configuration corresponding to a reading of "2359" on the digital clock, the next step involves a reset of the steppers 2, 4, 6, and 8 to character zero positons so that the time stepping unit assumes a configuration corresponding to a digital clock reading of "0000." This resetting is accomplished by the following sequence of events. Closing and opening of switch 50 by cam 48 one minute after the time stepping unit reaches its "2359" configuration causes pulsing of MM2. This rotates shaft 22 one step which in turn causes two events to occur: a lobe of cam 36 closes off-normal switch 38 and an arm of wiper 20 engages contact terminal 64. Closing of switch 38 places a ground from line 66, through line 68, switch 38, and switch 42 onto one end of motor magnet MM2 thus energizing this latter. Energizing of MM2 causes it to open interrupter switches 42 and 40 and to thereafter advance shaft 22 one step. Stepping of shaft 22 causes stepper switch 2 to return to the character zero position where it rests since at this position 38 is open. Thus the Minutes-Units stepper 2 is seen to have reached a configuration corresponding to "0" on the minutes-units register of the digital clock.

The engaging of contact terminal 64 by an arm of grounded wiper 20 energizes motor magnet MM4 by placing ground through line 72 on one end of MM4. The return to character zero position of stepper switch 2, as described in the preceding paragraph, deenergizes MM4 which causes shaft 90 of stepper 4 to advance one step. This stepping of shaft 90 causes wiper 98 to advance from the configuration corresponding to "5" in the minutes-tens column of the digital clock to a position where an arm of 98 engages the first of the strapped contacts 100. As previously explained, such as engagement causes fast self-stepping of stepper switch 4 to the character zero position. Thus the Tens-Units stepper 4 is seen to have reached a configuration corresponding to "0" on the minutes-tens register of the digital clock.

The aforementioned engagement of an arm wiper 98 with one of the strapped contacts 100 energizes relay 94 which closes switch 104 which in turn energizes motor magnet MM6. The aforementioned self-stepping of stepper switch 4 to the character zero position engages wiper arm 98 with an open contact, releasing relay 94 which opens switch 104, which in turn releases motor magnet MM6 causing stepper 6 to advance one step. When this one step constitutes, as it does in the situation now under consideration, a step forward from the configuration corresponding to a reading of "3" in the hours-units register of the digital clock and a simultaneous reading of "2" in the hours-tens register of the digital clock, then stepper 6 is caused to return to first position (character zero) by fast self-stepping by virtue of a ground being placed on the Nos. 5–11 positions terminals of the bank associated with wiper 116. As previously described, this ground arrives at first via wiper 112 on stepper 8 through any "2" position contact terminal which wiper 112 touches and thence through the strapping line 110; and thereafter via line 96 and line 126 to the No. 11 position terminal associated with wiper 116. As also previously explained, this ground produces the stepping of stepper 6 by reaching through wiper 116 to activate coil 118 which closes switch 122 thus energizing motor magnet MM6 through its interrupter switch 124. Thus the Hours-Units stepper 6 is seen to have reached a configuration corresponding to "0" on the hours-units register of the digital clock.

The activation of coil 118, described in the preceding paragraph, in addition to closing switch 122 also closes switch 120. As elsewhere previously described, the switch 120 remains closed for seven times the usual pulse length during fast self-stepping of stepper 6 and while so closed places a ground from line 126 onto one end of motor magnet MM8. Breaking of this ground connection upon deenergization of coil 118 results in a one-step advance of shaft 114 of stepper 8. Since a one-step advance in effect from any "2" position of shaft 114 invariably results in shaft 114 coming to rest at a "0" position, even though it may upon occasion require some fast self-stepping, the Hours-Tens stepper 8 is thus seen to have reached a configuration corresponding to "0" on the hours-tens register of the digital clock.

The aforedescribed reset of the time stepping unit to a configuration corresponding to a reading of "0000" on the digital clock recurs every twenty-four hours and involves a total of $24\times60=1440$ input pulses at the motor magnet MM2.

*Readout Unit and Line Control Unit*

The apparatus of the invention includes a readout unit which comprises a transmitter-distributor for sending out on a teletypewriter line the standard Teletype code chosen only for example corresponding to the digits of the digitized time. The apparatus of the invention also includes a line control unit for selectively connecting one of a group of teletypewriter lines to the readout unit. Since there are interdependent interactions of important significance between the readout unit and the line control unit the detailed descriptions of these units will be given together.

The information sent out over a standard teletypewriter order wire line to cause a teletypewriter or a teleprinter on the line to print consists of a group of pulses. When the line is not in use the loop is closed by a short circuit, the loop at this time carrying 60 mils. of current in the usual case. To start sending a message, a start pulse is sent consisting of opening the teletypewriter loop circuit for say 22 milliseconds in the case of a 60 words-per-minute machine. This start pulse is followed by five more 22 millisecond signals which may be sent either by opening the circuit, in which case the signal is called a "space" or by closing the circuit with a short-circuiting conductor, in which case the signal is called "mark." Every intelligence character is made up of a permutation of five signal pulses, each being either "space" or "mark." After the fifth intelligence pulse there must be a 31 millisecond stop pulse.

An illustration will perhaps most easily demonstrate the process of sending information. Let it be desired to send the numeral "3" over a line. On a typical teletypewriter the numeral "3" appears above the letter "E" which means that to operate the teletypewriter manually to print the numeral "3" one would depress the "FIG" shift key and thereafter strike the key having "E" in its lower case position and "3" in its upper case position. The "FIG" shift key on a conventional teletypewriter is somewhat similar to a shiftlock on a conventional typewriter in that it leaves the carriage in the upper case position. To return the teletypewriter to the condition for typing letters of the alphabet it is necessary to strike the "Letters" shift key which returns the carriage to lower case position. The electrical impulses sent out by depressing the "FIG" shift key are the following: Start pulse, mark, mark, space, mark, mark, stop pulse. The electrical impulses sent out by depressing the "3" or "E" key are the following: Start pulse, mark, space, space, space, space, stop pulse. To send the numeral "3" by automatic equipment such as the combination of the time stepping unit and the readout unit of this invention is suffices to send out the same sequence of pulses just described.

To send out the required pulses a somewhat modified standard Transmitter-Distributor, known in the teletypewriter art by its initials TD, is used in combination with a rotary stepping switch, similar to switches 2, 4, 6, and 8, to comprise the electrical readout unit. The TD is indicated generally at 132 and the stepper switch generally at 134. The TD 132 is driven by a continuously turning, constant speed motor 136 which continues to turn as long as switch 138 remains closed. This motor is supplied from any suitable source of electricity such as 115 volts A.C. commonly available. Through a friction clutch 140, controlled by a trip latch 142 coacting with stop arm 144, the motor 136 drives a shaft 146 on which are fixed a conductor arm 148 and a cam 150 for operating a switch 152. The TD 132 sends out the desired information pulses over the pair 154, 156 via buses 157, 159, respectively, to the appporiate teletypewriter line requesting the time information. This line is switched to the readout unit by the line control unit comprising relays 158, 160, 162, 164, 166 and push button switches or the like 168, 170, 172, 174, 176. For illustration only, five separate teletypewriter lines numbered 1 through 5 are shown, each associated with one of the aforementioned relays and push button switches. However, any desired number of teletypewriter lines can be used.

The information pulses sent out by the TD 132 are supplied by the readout stepper switch 134 as determined by the connections to the several terminals of the several banks of the stepper 134, certain of these connections being permanently fixed and the others being controlled by the actuation of ganged-contact relays associated with the time stepping unit. The contacts of these relays performing this control function are designated as the "A" contacts of the several relays and are marked, for example, MU1A, HU2A, etc. denoting, respectively, the "A" contact of the relay of the first bank of the Minutes-Units stepper, the "A" contact of the relay of the second bank of the Hours-Units stepper, etc. For clarity, the drawings show the armatures or their contacts of all these relays moved to the right in all figures when the coils of the relays are deenergized and moved to the left when the coils of the relays are energized.

The readout stepper switch 134 differs from the other illustrated stepper switches in that it has a two-circuit off-normal switch instead of a single-circuit type. It may be noted here that although steppers 4, 6, and 8 are shown as being provided with off-normal switches, because they come that way commercially, these off-normal switches are not used in the present invention. The readout stepper 134 is driven in the usual way by its motor magnet MM134 controlled by switch 152 provided with arc suppressor network 180. The off-normal cam 182 fixed on the shaft 184 of readout stepper 134 actuates element 186 at the home or normal position to open switch 188 and close switch 190. In the usual way motor magnet MM134 upon being energized opens interrupter switch 192.

The operation of the electrical readout unit will now be described.

OPERATION OF ELECTRICAL READOUT INTO TELETYPE LOOP

Although a principal object of the invention is to provide an apparatus for automatically sending out digitized time information over a teletypewriter line, the illustrated preferred embodiment actually is constructed to be able to send out ten characters in each message when it is interrogated. The first character is a "carriage return" or CR character and the second character is a "line feed" or LF character. These two characters place the teletypewriter in condition to print the intelligence at the left margin of a new line on the printing paper. The third character is a "Fig. Shift function" which causes the teletypewriter to shift is carriage into the upper case position and lock it there, as previously described, to prepare the machine to print the next four characters which are digits, each being located in the upper case position of a key having a letter in its lower case position. These next four characters are the digits representing time, varying only in the range from 0000 to 2359 wherein it is understood that the two rightmost digits represent minutes and can range only from 00 to 59 and the two leftmost digits represent hours and can range only from 00 to 23. The eighth character is the "letter shift function" to return the teletypewriter from upper case position to lower case position so that it will be ready to print letters. The ninth character is Z which, when used in U.S. Navy parlance immediately following the time digits, indicates that the time is Greenwich time, thus eliminating any confusion caused by difference in time zones between the sender and the recipient of a message. The tenth character is "Space," SP, which insures that the body of the teletypewritten message will be spaced from the time group to avoid confusion in reading the message.

To interrogate the equipment for the time and thus receive an automatic transmission of the time digits onto a teletypewriter line the subscriber pushes a button or the like to operate a momentary, normally-open switch such, for example, as 176. It is assumed that switch 62 is closed and switch 138 is closed. On the conditions that no other subscriber is already interrogating the equipment and that the readout stepper 134 is at rest, as it is in the position illustrated, then closing 176 energizes relay 166 by completing a circuit from one side of relay coil 166 to ground through lines 194, 196, 198, 200, 202 and thence through switch 188 and/or switch 192, and finally line 66. If any other subscriber is already interrogating the equipment a "busy" signal lamp 204 will be lit and furthermore the aforementioned circuit to ground will be open at the location of the contacts of that other subscriber's own relay (i.e. either 164, 162, 160, or 158) and hence the closing of switch 176 will be unable to complete the ground circuit to the coil of relay 166 and will thus accomplish nothing. This is a desirable feature since it prevents transmission over any subscriber's line of an incomplete time group message. By way of concrete illustration let it be assumed that the subscriber on Line 2 had initiated interrogation of the equipment prior to the closing of switch 176. This would mean that switch 170 had been closed to energize relay 160. Energizing relay 160 would cause movement of contact arm 206 to open switch 208 and close switch 210. Closing of switch 210 provides a holding circuit to ground so that relay 160 will remain energized even after button 170 is released. Opening of switch 208 breaks the continuity of line 198 to ground and thus forestalls energization of relay 166 upon closure of switch 176 so long as energized relay 160 continues to interrogate the equipment on behalf of Line 2.

There is a peculiar short interval of time immediately following the transmission to that other subscriber on Line 2 of the last (i.e. tenth) character of his time message, namely the character "Space." The peculiar time interval is the interval during which TD Shaft 146 is making the eleventh and last revolution of its readout cycle to that other subscriber. During this interval, readout stepper 134 is at its eleventh position with its wiper arms touching their respective eleventh position contacts and with a lobe of its off-normal cam 182 bearing against the off-normal spring element 186 so that off-normal springs 190 are closed and the off-normal springs 188 are open. The interval here under discussion starts at the moment when TD shaft 146 has progressed far enough into the start of its eleventh revolution to cause cam 150 to allow switch 152 to close, energizing motor magnet MM134. This energizing opens switch 192. Since now contacts 188 and 192, which are parallel ground connections reaching ground line 66 through line 212, are both simultaneously open, the ground connection to relay 160 is broken since the continuity of line 202 is broken at 188 and 192. This deenergizes relay 160 so that it can no longer be said that the subscriber on Line 2 is interrogating for time and his interrogation could no longer be said to prevent interrogation by the subscriber on Line 5. However, it still is not possible at this time for Line 5 to interrogate since the other obstructing condition mentioned early in the preceding paragraph now exists: the readout stepper 134 is not at its rest position. The selfsame simultaneous rupture of the ground connection at switches 188 and 192 effectively prevents button 176 from energizing relay 166 since the same aforementioned line 202 is needed by switch 176 to complete the circuit to relay 166. This simultaneous opening of the ground connections at switch 188 and 192 is occasioned by the fact that readout stepper is not at its rest position but rather is at its eleventh position.

The energizing of relay 166 upon pressing button 176 closes switches 214, 216, 218, and 220. The relay contacts at 218 and 220 are of the make-before-break type so that the normal short circuit 222 on Line 5 is replaced by the TD 132 circuit without any opening of the Line 5 loop which would cause a false start of the Line 5 teletypewriter circuit. If there were a momentary break in the Line 5 circuit the teletypewriter machines in the circuit would start an operation and should teletypewriter characters be introduced into the line immediately, the receiving teletypewriter machines would be out of synchronism with the sending machine and would garble.

Contact 214 on relay 166 is a hold contact allowing release of button 176 while permitting relay 166 to remain energized. Upon the energizing of relay 166 the plus voltage from battery 60 goes through switch 216 and line 224 completing the circuit to the "busy" signal lamp 204 which is permanently grounded at 226. Although illustrated as a single lamp, the "busy" signal lamp 204 can actually be several lamps in parallel to light up simultaneously and so placed that one is within view of each subscriber to advise him that the equipment is busy and cannot be interrogated by him until the light goes out. The "busy" signal remains on so long as Line 5 is attempting to interrogate the equipment. It should be noted that even though another subscriber should fail to observe the "busy" signal being on and attempt to interrogate the equipment he would nevertheless be unable to accomplish the interrogation since the very closing of the switch 216 which illuminates the "busy" lamp involves the opening of switch 228 which severs the live side connection to the line control relays of all other subscribers.

Providing that the time stepping unit is not undergoing a shift from one configuration to another, the energizing of relay 166 also causes the plus voltage from battery 60 appearing on line 224 to go through the coil of relay 88, thence through time shift lockout contacts 230, 232, 234, and 40, and line 68 to ground at line 66. If the time stepping unit is undergoing a shift then one or more of the time shift lockout switches 230, 232, 234, and 40 would be open, which would prevent the completion of the circuit through relay coil 88. However, this means that the energization of coil 88 is simply held in abeyance and delayed until all time shift lockout switches are closed. The energizing of relay 88 closes switches 236 and 238. The switch 236 is a holding switch which serves to maintain a ground connection (through line 226) on one side of relay coil 88 even though the original ground connection thereto through line 240 is later broken by the opening of a time shift lockout switch occasioned by a time shift occurring in the time stepping unit. The closing of switch 238 energizes the coil of clutch control relay 242.

The energizing of the coil of relay 242 pulls the trip latch 142 away from the rest position shown in the drawing against the tension of spring 244 out of the way of stop arm 144 of friction clutch 140. The friction clutch 140 thereupon engages and through it the continuously turning motor 136 is caused to rotate shaft 146, typically at a rate of 6.13 revolutions per second in the case of a TD designed for 60 words per minute. As the distributor arm 246 on the shaft 146 turns at this speed, it generates for transmission over the lines 154 and 156 connected to the interrogating teletypewriter line 22-millisecond pulses, except for a 31-millisecond stop pulse. These pulses constituting the signals sent over the teletypewriter line consist of what are known as dry signals and are composed to form the teletypewriter character code combination received by the distributor of the TD 132 from the readout stepping switch 134. These dry signals consist of either a short circuit between lines 154 and 156, previously described as "mark," or an open circuit between these lines, previously described as "space." In the art these signals are commonly abbreviated, respectively as M and S.

In the stop position of the TD 132 which is the rest position for shaft 146 and is the position shown in the drawings any teletypewriter loop circuit which would be interrogating would be closed, i.e. shorted or on "mark" since lines 154 and 156 are short-circuited by the path consisting of the inner ring 248, the conductor 148 and its brushes, and the stop segment 250. As the arm 246 rotates so that its outer brush touches the "start" segment of the distributor the teletypewriter loop is open-circuited. This start pulse keeps the circuit open. Then the first intelligence pulse can be either an open circuit (Space or S) pulse or a return to the stop (short circuit, mark, or M) pulse, depending on what is supplied by line 252 to the No. 1 segment of the distributor 132. This in turn depends on the position of the wiper 254 of the bank shown as No. 1 of the readout stepper 134. Similarly the second, third, fourth, and fifth intelligence pulses depend on the positions of the wipers of banks Nos. 2, 3, 4, and 5, respectively.

As previously mentioned, the illustrated embodiment is constructed to transmit a ten-character message. This is accomplished by the use of ten of the eleven positions of the readout stepper 134. Its eleventh position is not used. Starting in the illustrated configuration with shaft 184 of readout stepper 134 at its rest position with its wipers at their respective No. 1 positions, the TD 132 sends out the first character of the time message to the selected teletypewriter loop. As previously stated this is a CR character and is seen to be composed, in the standard Teletype code used for illustration, of SSSMS, transmitted as arm 246 sweeps around contacting each segment in turn of the distributor 132. Each "S" pulse in this case results from the first position contact terminal of a bank being free of any circuit connection and hence exhibiting an open circuit to line 154 when connected to it through the bank's wiper, the corresponding segment of the TD tied to that wiper, the brushes and conductor 148 of arm 246. The "M" pulse results from the first position contact of the No. 4 bank being tied to line 156 through the strapping connection 256 and line 258.

As the shaft 146 commences turning to move arm 246 through its first revolution, the cam 150 moves away from the illustrated position allowing switch 152 to close. The closing of switch 152 energizes motor magnet MM134, cocking its drive spring. As the shaft 146 completes its first revolution and conductor 148, after having sampled the connection on each of the wipers on the five numbered banks of readout stepper 134, enters into contact with the stop segment of distributor 132, the lobe of cam 150 comes into position again to open switch 152. The opening of switch 152 deenergizes motor magnet MM134 allowing its drive spring to advance stepper 134 one step so that its wipers touch their respective second position contacts. From these second position contacts transmitter arm 246 sends out over the teletypewriter line the second character of the message which is Line Feed (LF) represented by SMSSS. In similar fashion the completion of the second revolution of the shaft 146 advances stepper 134 to its third position where its contact terminals supply the fig. shift function MMSMM to be sent out over the selected teletypewriter line. A similar sequence of events occurs for the transmission of the last seven characters of the time message.

The first three characters of the message are seen to be invariable since the first three contact terminals of each of the five numbered banks of stepper 134 are permanently set up either as M or S. The next four characters are variable and are determined by the connections made to certain of the fourth, fifth, sixth, and seventh position contact terminals on the banks of stepper 134 by switch contacts of relays HU, HT, MU, and MT. In the illustrated configuration the time stepping unit is set to read 0000 and the status of these aforementioned relays is accordingly such as to insure an electrical readout of 0000. The character code for zero is SMMSM. Inspection will show that this character is set up correctly but by different types of connections in the different register positions as hereinafter immediately explained.

Choosing the hours-tens zero and the hours-units zero for contrasting examples, the following chart shows two different types of circuit arrangements producing the same character.

HOURS—TENS ZERO

| Contact No. | Bank No. | Connection | Symbol |
|---|---|---|---|
| 4 | 1 | HT1A open | S |
| 4 | 2 | To strap line 256 | M |
| 4 | 3 | HT3A closed | M |
| 4 | 4 | Blank | S |
| 4 | 5 | To strap line 256 | M |

HOURS—UNITS ZERO

| Contact No. | Bank No. | Connection | Symbol |
|---|---|---|---|
| 5 | 1 | HU1A open | S |
| 5 | 2 | HU2A closed | M |
| 5 | 3 | HU3A closed | M |
| 5 | 4 | HU4A open | S |
| 5 | 5 | HU5A closed | M |

The eighth character is letters function (LTR) to return the teletypewriter from upper to lower case position. The pulse permutation for this is MMMMM. The ninth character is Z which is MSSSM. The tenth character is "Space" which is SSMSS.. These last three characters are invariable and are not under control of relays governed by the time stepping unit.

An example of a character whose every pulse is under control of a relay is the minutes-units digit controlled by the MU1–5 relays. This character is sent out as the seventh character of each message. All the relay coils Mu1–5 are tied on one side to the plus terminal of battery 60 by means of line 260. Going through any one of these relay coils and the attached wiper of its associated bank of stepper switch 2 reaches either ground or an open circuit depending on the code required for a particular character. In the illustrated configuration with the time set at 0000 then of course the seventh character to be sent, i.e. the minutes-units digit, is zero. Recalling the convention used in the drawings, that with a relay deenergized its movable contacts are shown to the right, and vice versa when deenergized, the following chart shows the status of the various elements while set up to produce zero as the minutes-units character of the message sent out on the teletypewriter line.

| Relay | Relay wiper connection | Relay coil status | Relay contact status | Circuit condition of 7th position contacts of 134 | Symbol |
|---|---|---|---|---|---|
| MU1 | Open | Deenergized | MU1A open | Bank No. 1 open. | S |
| MU2 | Ground | Energized | MU2A closed | Bank No. 2 closed. | M |
| MU3 | Ground | Energized | MU3A closed | Bank No. 3 closed. | M |
| MU4 | Open | Deenergized | MU4A open | Bank No. 4 open. | S |
| MU5 | Ground | Energized | MU5A closed | Bank No. 5 closed. | M |

After completing the seeding of the tenth character of the time message to the interrogating subscriber it is desirable for the equipment to accomplish certain other functions: advancing the readout stepper 134 through its unused eleventh position back to its initial first position and bringing it to rest there; bringing the TD to rest at its proper stop position; insuring that no pulses are sent to the subscriber during the accomplishment of these first two functions; and severing the connection between the subscribers teletypewriter line and the TD. An analysis of the sequence of events towards the end of a readout cycle will show how these desired functions are accomplished.

While the shaft 184 of readout stepper 134 is at its tenth position with each of its wiper arms contacting, respectively, the tenth contact of its bank, the shaft 146 of TD 132 is executing the tenth revolution of its cycle. As the arm 246 of TD 132 commences its tenth revolution and passes from the "stop" segment 250 of the TD 132 (with which segment it is shown in contact in the illustrated configuration) toward the "start" segment, cam 150 moves away from its illustrated high position and allows switch 152 to close. Swith 152 remains closed during the time while arm 246 sweeps across segments "start," "1," "2," "3," "4" and "5" of the TD. As soon as switch 152 was closed the motor magnet MM134 was energized, performing two functions: the opening of interrupter switch 192 and the cocking of the drive spring of readout stepper switch shaft 184.

As shaft 146 of TD 132 completes its tenth revolution bringing arm 246 from segment "5" into the "stop" segment, cam 150 thereupon opens switch 152 as arm 246 enters the "stop" segment. The opening of switch 152 deenergizes motor magnet MM134 allowing two things to occur: the interrupter switch 192 closes and the cocked drive spring advances shaft 184 one step to its eleventh position. With shaft 184 in its eleventh position, a lobe of cam 182 bears against off-normal switch arm 186 thus closing switch 190 and opening switch 188.

The closing of switch 190 shorts out the pair 154 and 156 so that whatever is read by the TD conductor 148 as it undergoes its eleventh revolution will not be sent out over the teletypewriter line. This is essential because while shaft 184 is pausing at its eleventh position all its wipers are contacting blank terminals since no information is intended to be transmitted at the eleventh position. Thus as conductor 148 sweeps by segments "1," "2," "3," "4" and "5" it would read only blanks or open circuits and these, if transmitted to the teletypewriter line, would constitute erroneous information.

Actually, an entire character represented by this sweeping of conductor 148 by all segments of TD 132 would not be transmitted to the teletypewriter line because the deenergizing of relay 166, as hereinafter explained, severs the connection between Line 5 and pair 154, 156 of TD 132 shortly after the initiation of the eleventh revolution of conductor 148. However, it is quite essential to prevent the transmission of the partial character represented by the sweeping of conductor 148 past whatever few segments of the TD 132 it can pass during the time it takes relay contacts 218 and 220 to open.

The opening of switch 188 is part of the preparation for the interruption of the ground connection leading to line control relay 166.

As shaft 146 rotates enough to bring arm 148 into contact with the "start" segment of TD 132, it also moves cam 150 off its high position allowing switch 152 to close. As previously noted, the closing of switch 152 causes two things to happen as a result of its energizing coil MM134: the interrupter switch 192 is opened and the drive spring for shaft 184 is cocked. The opening of switch 192, which is thus seen to occur at the same time that switch 188 is held open by cam 182 being in its eleventh position, completes the breaking of the double or parallel path to ground for the coil of relay 166. Since both of the parallel paths to ground are open simultaneously, relay 166 is deenergized, which in turn deenergizes relay 88, which in turn deenergizes relay 242. Deenergizing of relay 242 allows trip latch 142, under the action of its spring 244, to assume a position to obstruct projection 144 when 144 completes its eleventh revolution.

As shaft 146 continues its eleventh revolution it brings conductor 148 into the "stop" segment of the TD 132 and simultaneously brings cam 150 into position to open switch 152. Upon the opening of switch 152 motor magnet MM134 is deenergized allowing switch 192 to close and allowing the cocked drive spring to advance shaft 184 one step. This advancing of one step places shaft 184 in its first position and in so doing rotates the lobe of off-normal cam 182 out of contact with the off-normal switch arm 186, thus opening switch 190 and closing switch 188.

The opening of switch 190 at this time does no harm to the operation of the teletypewriter line since at this time, with arm 148 on the "stop" segment 250, the arm 148 itself completes a short circuit for pair 154, 156 to replace the one lost by the opening of switch 190. In fact, since conductor 148 enters into contact with "stop" segment 250 before switch 190 opens there are two parallel short circuits across the pair 154, 156 and there is never an open circuit during this transition interval to cause difficulty.

The closing of switch 188 provides an additional path to ground in parallel with the now-closed switch 192 for the next energization of the now-deenergized relay 166 (or any other line control relay) upon the closure of its manual switch 176 to interrogate the equipment again for time.

As shaft 146 completes its eleventh revolution, which it is thus seen to do after deenergization of control relay 166, projection 144 on clutch 140 abuts against the now-obstructing trip latch 142 bringing shaft 146 to a stop with conductor 148 still in brush contact with the "stop" segment 250 of the TD 132, and with cam 150 holding switch 152 open. This is the rest configuration shown in the drawings. In this configuration the equipment is ready to be interrogated for the digital time information by any subscriber.

It should be noted that it is only when shaft 184 is in its eleventh position that switch 188 and switch 192 are simultaneously open, completely cutting off the ground to all line control relays such as 166 and preparing the trip latch 142 to stop the motion of shaft 146 at the completion of the particular revolution which it is then undergoing. With shaft 184 in any other position than the eleventh the switch 188 remains closed, insuring a continuous ground for line control relay 166 or the like even while the ground through switch 192 is being broken during each step advancement of shaft 184. This continuous ground insures continuous uninterrupted rotation of shaft 146 until shaft 184 has reached its eleventh position and thus provides for the uninterrupted sending out on the teletypewriter line of the ten-character message.

The operation of the electrical readout described, by way of example only, as applied to Line 5, occurs in substantially the same way for the other lines. However, an optional feature is illustrated as applied to one line only, namely, Line 1. This is a manually-controlled means to delete the automatic Line Feed function from the time message for this one teletypewriter order wire line only. This feature saves paper on an order wire circuit when has no need for the Line Feed. Closing switch 262 places a short circuit across Line 1 by means of the pair connected to the wiper and the second position contact of the (unnumbered) sixth bank of the readout stepper 134. This short circuit occurs only while the readout stepper 134 is at its second position and thus prevents transmission to Line 1 of the Line Feed function which would otherwise be transmitted via lines 154 and 156 during the interval when stepper 134 remains at its second position.

As previously indicated, a time shift lockout circuit is provided to prevent energization of readout control relay 88 (which would initiate a readout cycle) at a time when the time stepper unit is undergoing a time shift. This prevents a readout of garbled or erroneous time information. A more detailed analysis will now show how the apparatus prevents transmission of erroneous or garbled time information at all instants of every one-minute time cycle of the equipment.

As explained hereinbefore, constant speed motor 46 rotates cam 48 at 1 r.p.m. The cam 48 closes switch 50 for two seconds of each minute and leaves switch 50 open for the remaining 58 seconds. During the two-second interval motor magnet coil MM2 is energized as the prelude to a time shift of time stepping switch 2 and switch 40 is opened. Opening switch 40 prevents ground from reaching readout control relay 88 so that a readout cannot be initiated during the two-second period and indeed until motor magnet MM2 has been deenergized causing the stepper 2 to advance one step to a new position. Similarly, initiation of a readout cycle is prevented by the opening of switches 230, 232, or 234 incident upon energizing relay coils as a prelude to stepping of their respective stepper switches. During the 58-second remainder of the cycle of cam 48 switch 40 generally remains closed and thus does not prevent energizing of coil 88 to initiate a readout cycle. Usually such a readout cycle initiated during this 58-second interval will have plenty of time to complete itself without question. However, a question arises in the case where readout control relay coil 88 is energized just prior to cam 48 closing switch 50. In this case the relay 88 having been energized by push button 176 will remain energized through the holding switch 236 to ground even though closure of switch 50 breaks the ground connection at switch 40. The readout cycle initiated by the energizing of relay 88 will complete itself and will send out correct, ungarbled information for the reasons that the closing of switch 50 by cam 48 and consequent energizing of motor magnet MM2 serve only to cock the drive spring of shaft 22 of stepper 2; stepper switch 2 remains motionless for the two seconds while switch 50 is closed; and the readout of ten characters takes less than two seconds when using a 60 word-per-minute TD such as 132.

VISUAL READOUT

The visual readout of the time can be accomplished by any suitable digital display device. Illustrated in FIG. 4 is one found quite satisfactory and made up of four in-line digital display units well known in the prior art. These are indicated generally at 264 and shown displaying time 0000. Each unit has a plurality of lamps, each lamp with an individual mask, which project their respective symbols on a common screen. The lamps are usually low voltage, being supplied by a step-down transformer 266 from a standard 115 volt source. The units selected for this device have the numerals 0 through 9 on ten lamps. The lamps are controlled by ganged contacts on relays MU, MT, HU, and HT as evident from the schematic showing in the drawings.

Modifications of this invention can apparently be made within the inventive concept. For example, in place of the push-button type switch exemplified schematically at 176 to energize a line control relay, it has been found quite satisfactory to use switch operating equipment already built into a teletypewriter. For instance, the normally little-used case "H" position has been adapted so that the upper case "H" Teletype code combination is used for operation of the automatic time sender circuit by remote stations on a teletypewriter order wire line. In the teletypewriter equipment located closest, physically, to the line control unit, an upper case "H" function bar and lever, operating a pair of switch contacts similar to those used for the signal bell, is installed. The momentary operation of these contacts upon reception of Figures "H" is sufficient to lock in the line control relay and operate the readout unit for one cycle.

Other types of line control units can be substituted for the one illustrated. For example, it is possible to use a unit which will hold one or more requests for time if the time transmitter is busy and then transmit the time message either simultaneously to all interrogating stations in the next operating cycle or in sequence on a first-to-ask-first-to-receive basis.

Obviously many other modifications and variations of the present invention are possible in the light of the above teachings. It is therefore to be understood that within the scope of the appended claims the invention may be practiced otherwise than as specifically described.

What is claimed is:

1. A teletypewriter system comprising a time stepping unit whose configuration represents digitized time; an order wire line leading to a teletypewriter printing apparatus; means controlled by said time stepping unit for establishing a source of signal elements constituting the teletypewriter code combination corresponding to the characters representing the digitized time associated with the configuration of the time stepping unit; a readout unit for transmitting to said order wire line in proper serial form a time message including said signal elements from said source; line control means for connecting said readout unit to said line; and means to prevent initiation of a readout cycle of said readout unit to transmit signals to said order wire line during a time shift process of said time stepping unit wherein said time stepping units steps from one configuration to another corresponding to the passage of a time interval.

2. The system of claim 1, wherein said readout unit comprises a transmitter-distributor for supplying said signal elements to said order wire line, further including; momentarily-operable means for connecting said line to said transmitter-distributor; holding means operable after release of said momentarily-operable means to retain said line in connection with said transmitter-distributor; and means operable upon completion of transmission by said readout unit of said time message for disabling said holding means to disconnect said line from said transmitter distributor.

3. The system of claim 2 further including means to emit a signal perceptible to the operator of teletypewriter equipment actuated during the time shift process of said time stepping unit to warn the operator against interrogating for a time message.

4. The system of claim 3 further including a digital visual display unit controlled by said time stepping unit to indicate, by exhibiting numerals, the time corresponding to the configuration of said time stepping unit.

5. An apparatus of the character described for use in a system having a plurality of order wire lines, to each of which lines is attached a teletypewriter printing equipment, comprising a time stepping unit whose configuration represents digitized time; means controlled by said time stepping unit for establishing a source of signal elements constituting the teletypewriter code combination corresponding to the characters representing the digitized time associated with the configuration of the time stepping unit; a readout unit for transmitting to said order wire lines in proper serial form a time message including said signal elements from said source; and a line control unit including separate means associated with each line for connecting said line to said readout unit to interrogate for a time message, means operable upon actuation of any one of said separate means connecting its own line to said readout unit to prevent actuation of all of the rest of said separate means to interrogate for a time message so long as said one separate means continues to connect its own line to said readout unit; and means also operable upon actuation of said one separate means to exhibit a signal preceptible to a teletypewriter operator to warn against interrogating for a time message.

6. The apparatus of claim 5, wherein said readout unit comprises a transmitter-distributor for supplying said signal elements to said order wire lines; and wherein each of said separate means comprises momentarily-operable means for connecting its own line to said transmitter-distributor, holding means operable after release of said momentarily-operable means to retain said last mentioned line in connection with said transmitter-distributor; said apparatus further including means operable upon completion of transmission by said readout unit of said time message for disabling said holding means to disconnect said last mentioned line from said transmitter-distributor.

7. The apparatus of claim 6 further including means to prevent initiation of a readout cycle of said readout unit to transmit signals to any of said order wire lines during a time shift process of said time stepping unit wherein said time stepping unit steps from one configuration to another corresponding to the passage of a time interval.

8. The apparatus of claim 7 further including means to emit a signal perceptible to subscribers on said plurality of order wire lines actuated during the time shift process of said time stepping unit to warn the subscribers against interrogating for a time message.

9. The apparatus of claim 8 further including a visual display unit controlled by said time stepping unit to indicate, by exhibiting numerals, the digitized time corresponding to the configuration of said time stepping unit.

References Cited in the file of this patent

UNITED STATES PATENTS

| | | |
|---|---|---|
| 2,543,983 | Ostline | Mar. 6, 1951 |
| 2,584,997 | Ferguson | Feb. 12, 1952 |
| 2,690,474 | Edgar | Sept. 28, 1954 |

UNITED STATES PATENT OFFICE

CERTIFICATE OF CORRECTION

Patent No. 3,144,509 August 11, 1964

Herbert S. Schory et al.

It is hereby certified that error appears in the above numbered patent requiring correction and that the said Letters Patent should read as corrected below.

Column 1, line 20, for "teletype" read -- Teletype --; column 2, line 17, for "teletype" read -- teletypewriter --; line 46, for "Transmitter-Distributtor" read -- Transmitter-Distributor --; line 65, for "teletype" read -- teletypewriter--; column 4, line 66, after "switch" insert -- 2 --; column 9, line 50, for "as" read -- an --; line 55, after "arm" insert -- of --; column 11, line 4, for "is" read -- it --; column 12, line 2, for "is" read -- its --; column 15, line 61, for "Mu" read -- MU --; column 16, line 15, for "seeding" read -- sending --; line 37, for "Swith" read -- Switch --; column 18, line 4, for "when" read -- which --.

(SEAL)

Signed and sealed this 12th day of January 1965.

Attest:

ERNEST W. SWIDER
Attesting Officer

EDWARD J. BRENNER
Commissioner of Patents